United States Patent [19]

Salowe et al.

[11] Patent Number: 4,670,891

[45] Date of Patent: Jun. 2, 1987

[54] STORAGE OF DATA IN COMPRESSED FORM

[75] Inventors: Seymour Salowe, Murrysville Boro; George T. Mallick, Jr., Penn Hills Township, Allegheny County, both of Pa.

[73] Assignee: Westinghouse Electric Corp., Pittsburgh, Pa.

[21] Appl. No.: 709,239

[22] Filed: Mar. 6, 1985

[51] Int. Cl.⁴ .............................................. G01D 1/00
[52] U.S. Cl. .......................................... 377/20; 377/26
[58] Field of Search ....................... 377/20, 26, 49, 51; 364/414

[56] References Cited

U.S. PATENT DOCUMENTS

| 3,559,066 | 1/1971 | Pincus | 377/20 |
|---|---|---|---|
| 3,567,913 | 3/1971 | Baumer et al. | 377/20 |
| 3,656,060 | 4/1972 | Bauernfeind et al. | 377/20 |
| 3,955,070 | 5/1976 | Suzuki et al. | 377/20 |
| 4,041,281 | 8/1977 | Gaudeul | 377/20 |
| 4,093,850 | 6/1978 | Karnowski et al. | 377/51 |
| 4,399,354 | 8/1983 | Schaeffer | 377/20 |

Primary Examiner—John S. Heyman
Assistant Examiner—Karl Ohralik
Attorney, Agent, or Firm—Daniel C. Abeles

[57] ABSTRACT

Method and apparatus for monitoring the time rate of successive events the rate of occurrence of which can vary over a wide range by: detecting the successive events during a succession of consecutive time intervals of equal duration; producing successive counts each representing the number of events occurring during each interval in which at least one event occurs; producing successive counts each representing the number of intervals between the end of a respective interval in which at least one event occurred and the end of the immediately preceding interval in which at least one event occurred; and storing representations of the successive counts produced.

10 Claims, 2 Drawing Figures

STORAGE OF DATA IN COMPRESSED FORM

BACKGROUND OF THE INVENTION

The present invention relates to the acquisition and storage of data relating to a time dependent variable the value of which can vary over a wide range.

For many purposes, it is necessary to store data representing the values of a variable which can take on a wide range of values. Frequently, if the data is being generated over a period of time, a large number of storage locations must be made available for the storage of values.

By way of example, in a nuclear reactor flux monitoring system, flux detecting transducers generate pulses at a rate which is proportional to the reactor flux. The reactor flux can vary over a range of the order of eight decades, from 0.01 count per second to $1 \times 10^6$ counts per second as the reactor goes from shutdown to full power output. The transducer output pulses will occur in a random pattern.

According to one known procedure, the pulses are counted during a succession of fixed time intervals each having a duration of the order of 100-125 milliseconds and the number of pulses produced during each time interval is stored in a respective memory location for subsequent processing.

At high pulse rates, a sufficient number of pulses is generated during each measuring interval to allow an accurate calculation of pulse rate after just a few intervals have elapsed.

However, when the pulse rate has a low value, monitoring must continue over a large number of intervals before an accurate pulse rate indication can be produced. For example, if the pulse rate has a nominal value of 0.1 pulse per second, only one pulse will occur, on average, during 100 intervals. Moreover, because of the random nature of the pulses, an accurate indication cannot be produced on the basis of a single pulse.

The accuracy with which an average pulse rate can be computed when the occurrence of pulses varies according to a Poisson distribution, can be estimated according to the following relationship:

error = 1/square root of number of pulses.

For example, if 150 pulses are counted, the error would be be of the order of 8.16%. To achieve this accuracy at a nominal pulse rate of 0.01 pulse per second with measuring intervals of 100 milliseconds, the measuring operation would have to cover 150,000 intervals. If the data is stored in the form of representations of the number of pulses occurring during each interval, 150,000 memory locations would be required to store the data for performing one calculation.

SUMMARY OF THE INVENTION

It is an object of the present invention to reduce the memory capacity which must be provided to store such data prior to processing, while permitting accurate calculations over a wide range of pulse rate values.

Another object of the invention is to permit ready calculation of changes in the pulse rate being monitored.

The above and other objects are achieved, according to the invention, by an apparatus and method for monitoring the time rate of a succession of events the rate of occurrence of which can vary over a wide range by:

detecting the successive events during a succession of consecutive time intervals of equal duration;

counting the number of events occurring during each interval;

counting the number of successive intervals during which no event occurs; and storing a representation of the number of events occurring during each interval in which at least one event occurs and a representation of the total number of intervals which elapsed since the previous interval in which at least one event occurred.

The present invention can be implemented by the provision of a memory whose locations are organized in the form of a double entry table composed, at least conceptually, of two adjacent columns of memory locations. The memory locations in one column are arranged to store data pulse count values, while the memory locations of the other column are arranged to store interval count representations. The memory locations are arranged in pairs so that the data pulse count stored in a location of one column represents the total number of data pulses counted during the intervals for which a count is stored in the associated memory location of the other column. Each time count information is written into the first memory locations of the two columns, the information previously stored in each memory location is shifted to the next succeeding location of the same column.

If the pulses being received occur at a relatively low rate such that no pulse will occur during several successive measuring intervals, the number of such intervals will be counted and only after at least one data pulse occurs will the data pulse count and an associated interval count be stored in the uppermost memory locations of the two columns. The interval count will correspond to the number of preceding intervals during which no pulse occurred plus the interval during which a pulse occurred.

As a result, if, for example, it is desired to count 150 pulses before a pulse rate calculation is performed, only 150 memory locations must be provided in each column, or a total of 300 memory locations in the two columns. In contrast, if the pulse count associated with each interval were stored in a respective memory location, it would be necessary to provide 150,000 such locations to accurately measure a pulse rate of 0.01 pulse per second.

DESCRIPTION OF THE PREFERRED EMBODIMENTS

Figure 1:
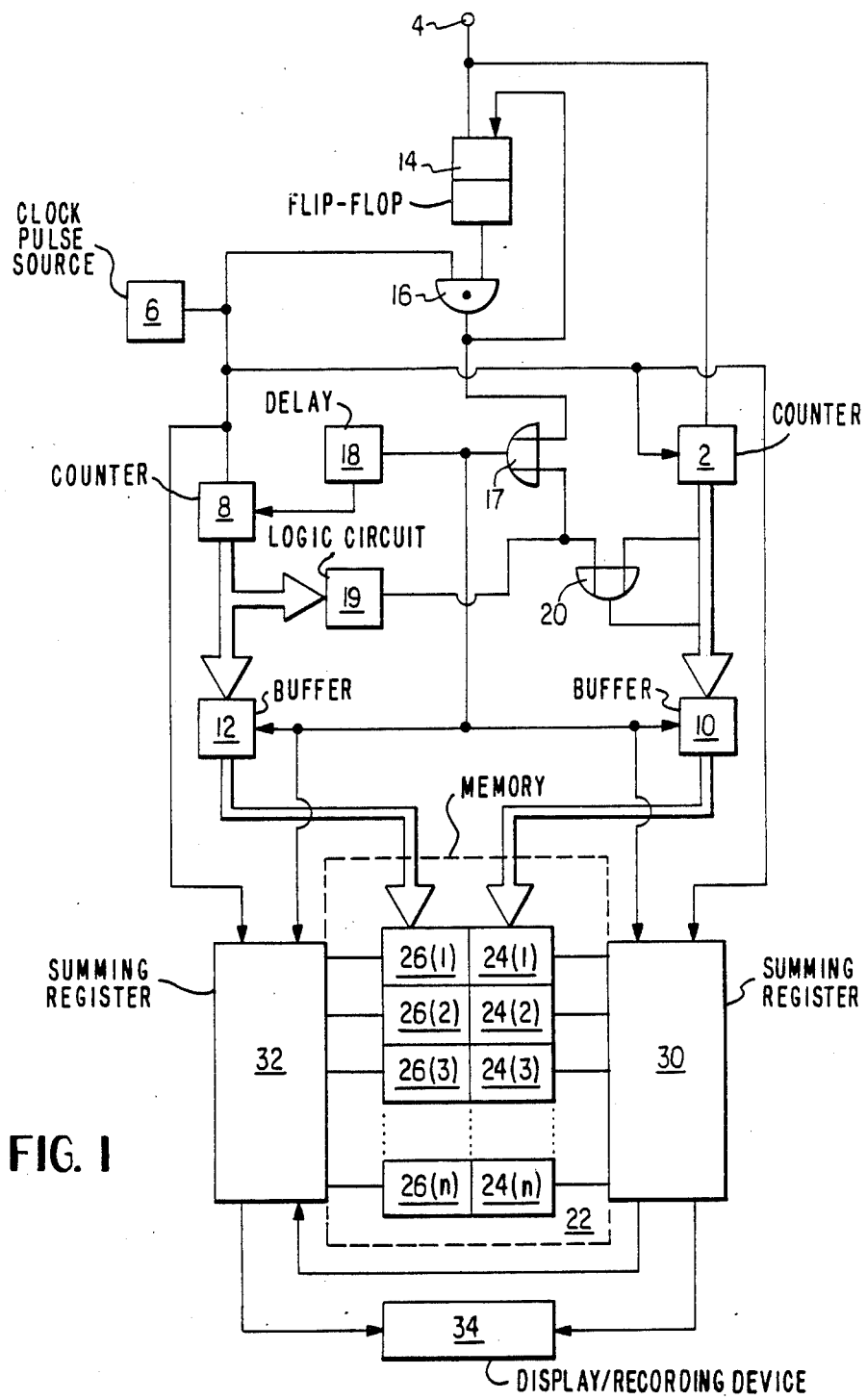
FIG. 1 is a block circuit diagram of a preferred embodiment of a circuit for carrying out the present invention.

FIG. 1 shows, in block diagram form, one preferred embodiment of a circuit constructed to derive and store data in accordance with the present invention. The connecting lines appearing in the Figure represent single conductors while the double parallel lines represent plural conductor paths for conducting plural binary signals in parallel.

The illustrated circuit includes a data pulse counter 2 connected to an input terminal 4 which receives one data pulse for each event to be detected. Pulse counter 2 counts each pulse appearing at input 4 and produces a plural bit digital output signal representative of its current count. The pulses arriving at input 4 are counted during successive monitoring time intervals each constituted by the period between two successive pulses from a clock pulse source 6. Each pulse produced by source 6 is supplied to a reset input of counter 2 and acts to reset counter 2 to a count of 0.

The pulses produced by clock pulse source 6 are also applied to the count input of an interval counter 8 which produces at its output a plural bit digital count signal representing its current count state. Interval counter 8 is further provided with a reset input for application of a signal to reset the counter to its 0 count state.

The count output of data pulse counter 2 is supplied in parallel to a buffer memory 10 which stores a representation of the current count state of counter 2. Similarly, the count output of interval counter 8 is supplied in parallel to a buffer memory 12 which stores a representation of the current count state of counter 8.

A bistable flip-flop 14 is provided with a set input connected to data pulse input terminal 4 and with a direct output connected to one input of an AND gate 16. The output of gate 16 is connected to the reset input of flip-flop 14 and, via an OR gate 17, to gating inputs of buffer memories 10 and 12. A second input of AND gate 16 is connected to the output of clock pulse source 6.

The reset input of interval counter 8 is connected to the output of AND gate 16 via OR gate 17 and a delay member 18 producing a short time delay sufficient to assure that a pulse produced by source 6 and triggering an output signal from gate 16 will contribute to the output count state of counter 8, and will thus be included in the representation stored in the buffer memory 12, before counter 8 is reset to its 0 state.

The count output of interval counter 8 is also supplied in parallel to a logic circuit 19 which produces a single bit output when counter 8 attains a count of 256 clock pulses. This single bit output is supplied to the other input of OR gate 17 and to one input of an OR gate 20. The other input of OR gate 20 is connected to the least significant bit, or $2^0$, bit line of the output from counter 2 and the output of OR gate 20 is connected to the corresponding least significant bit input of buffer memory 10.

Buffer memories 10 and 12 are connected to a memory 22 provided with two stacks of memory locations 24(1), (24(2) ... 24(n); 26(1), 26(2) ... 26(n). All of the memory locations 24 are connected to a summing register 30 which receives the count representations stored in all memory location 24. Similarly, all memory locations 26 are connected to a summing register 32 which receives the count representations stored in all locations 26. Registers 30 and 32 are connected to a display and/or recording device 34 constructed to display and/or record the average rate of the pulses supplied to input 4 at least during the most recent monitoring period, which can cover a single time interval or a succession of time intervals.

In the operation of the circuit shown in FIG. 1, each of counters 2 and 8 is initially in its 0 count state and flip-flop 14 is in its reset state, in which it does not produce an output signal. A monitoring operation is begun by placing clock pulse 6 in operation so that it produces a pulse at the end of each monitoring interval and input 4 is simultaneously connected to receive the data pulses which are to be monitored. If no data pulse appears during a monitoring interval, clock pulse source 6 produces an interval pulse which advances the count of counter 8 by one unit and resets data pulse counter 2, and AND gate 16 will not produce an output signal, so that the representations stored in buffer memory 10 and 12 will not be transferred to memory 22.

This sequence continues, with each clock pulse produced by clock pulse source 6 being counted by counter 8, until there occurs an interval during which at least one data pulse appears at input 4. Upon the appearance of the first data pulse, flip-flop 14 is set to produce an output signal. The data pulse or pulses applied to input 4 are additionally counted by data pulse counter 2.

At the end of that interval, clock pulse source 6 produces a clock pulse which is counted by interval counter 8 and which additionally acts to cause AND gate 16 to produce an output signal which acts to transfer the representations currently stored in buffer memories 10 and 12 to the first, or uppermost, memory locations 24(1) and 26(1), respectively, of memory 22.

After a short delay, controlled by member 18, the signal from gate 16 additionally resets counter 8 to its 0 count state. The output pulse from counter 6 again acts to reset counter 2.

At this time, the uppermost memory location 24(1) contains a representation of the count previously stored in counter 2, while the uppermost memory location 26(1) contains a representation of the count previously stored in counter 8.

This operating sequence is repeated until there again occurs an interval during which data pulses appear at input terminal 4. At the end of that interval, the representations stored in buffer memories 10 and 12 are read into the uppermost memory locations 24(1) and 26(1), while the representations previously stored in the uppermost memory locations 24(1) and 26(1) are transferred to the next memory locations 24(2) and 26(2) immediately therebelow. At the time of the next read-in to memory 22, the representations stored in locations 24(2) and 26(2) will be transferred to locations 24(3) and 26(3), and so on at the time of successive read-ins until reaching the last locations 24(n) and 26(n), whereafter those representations are no longer needed and are discarded.

Thus, at any point in the monitoring operation, the most recent counter output representations are stored in the uppermost memory locations 24(1) and 26(1), while previously derived representations are stored in the corresponding memory locations therebelow in chronological order.

In the case of a data pulse rate having a relatively low value, successive ones of the memory locations 24 will each contain a representation of one or possibly several pulses, while the corresponding ones of memory locations 26 will contain representations of a large number of time intervals. A representation of more than one data pulse will be stored only if several data pulses occur during a single interval.

On the other hand, in the case of a relatively high data pulse rate, each memory location 24 will contain a representation of a plurality of data pulses, while each memory location 26 will contain a representation of one time interval.

Since the monitoring operation of the type contemplated by the present invention is applied to a sequence of pulses having a certain degree of randomness in the rate at which they occur, a certain number of pulses must be counted in order to achieve a particular level of accuracy in the resulting pulse rate indication. For example, in order to reduce the measuring error to a value of 8.16%, 150 such pulses should be counted.

In order to achieve this accuracy, each pulse rate calculation is performed by summing, in register 30, the total number of data pulse count representations stored in successive memory locations 24, starting from the uppermost location 24(1), until a total of at least 150 data pulse counts has been accumulated. Then the interval representations stored in the corresponding group of memory locations are summed in register 32 and the resulting sum values are transferred to device 34. For this purpose, register 30 is connected to supply the relevant memory location information to register 32.

Device 34 will then perform a simple division operation and produce a display of the ratio of the total number of data pulses to the total number of corresponding clock pulse intervals.

The contents of memory locations 24 and 26 are preferably interrogated at the end of each clock pulse interval even when new data has not been written into the uppermost locations. For this purpose, the output of clock pulse source 6 is additionally connected to each of registers 30 and 32. Since it is comtemplated that measuring intervals having a duration of the order of 100 to 125 milliseconds will be employed, interrogation of all memory locations during each interval will pose no implementation problems.

It will thus be appreciated that since each memory location 24 will contain a representation of at least one data pulse, only a total of 150 pairs of memory locations 24, 26 is required to provide a pulse rate indication having the desired accuracy no matter how low the pulse repetition rate. If greater or less accuracy is desired, the number of data pulse representations to be summed and the number of pairs of memory locations that must be made available can be correspondingly varied.

Device 34 can additionally provide an indication of the rate of change of the pulse rate being monitored by comparing the pulse rates associated with successive time periods.

Figure 2:
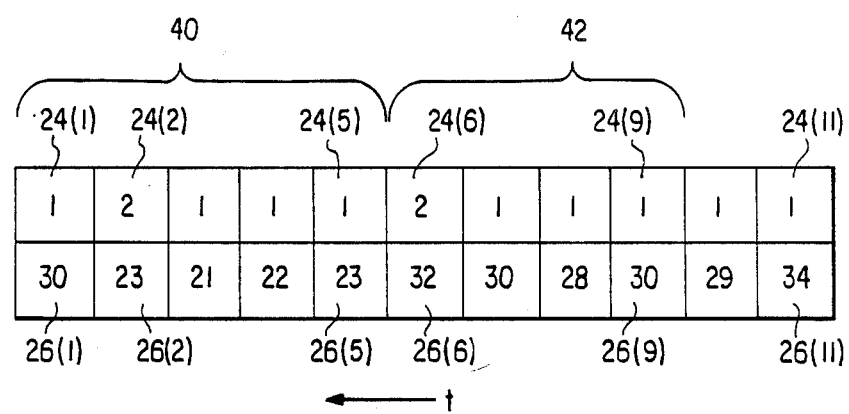
FIG. 2 is a diagram of part of the circuit of FIG. 1.

One preferred manner of providing such an indication according to the invention is illustrated in FIG. 2, which depicts a group of the memory locations 24(1) to 24(11) and 26(1) to 26(11) of FIG. 1 containing illustrative count values. The left-hand locations 24(1) and 26(1) correspond to the uppermost locations 24(1) and 26(1) of FIG. 1.

Thus, the most recently generated counts appear at the left-hand memory locations 24(1) and 26(1) of FIG. 2 and the oldest counts depicted in FIG. 2 are at the right-hand locations 24(11) and 26(11). The direction of the corresponding time scale, t, is shown by the arrow.

For purposes of this description, and for the sake of simplicity, it is assumed that the number of data pulses required for each pulse rate calculation is six.

At the point in time depicted in FIG. 2, register 30 determines that a total of six data pulse counts is stored in the memory locations 24(1) to 24(5) of a memory location group 40. Therefore, the data pulse counts in locations 24(1) to 24(5) are summed, as are the interval counts in locations 26(1) to 26(5), and a division is performed to produce a pulse rate indication.

To then generate an indication of the rate of change of pulse rate, subsequent interval count memory locations are interrogated and their count representations summed, starting from location 26(6) and continuing through successive interval count locations, until arriving at an interval count sum at least equal to the interval count sum on which the pulse rate calculation was based, in the case of this example, the pulse rate calculation having been based on the sum of the interval count representations stored in locations 26(1) to 26(5), which equals 119 intervals.

The interrogation and summing beginning with location 26(6) establishes that interval count locations 26(6) through 26(9) contain representations of 120 intervals, so that the memory location group 42 containing those interval count locations is used for the rate of change calculation. For this purpose, the total number of data pulse counts in locations 24(6) to 24(9) of group 42 is summed and this sum is divided, in device 34, by the sum of the counts stored in locations 26(6) to 26(9) to generate an associated pulse rate value. As can been seen, the data pulse count in locations 24 of group 42 can be greater or less than the number, six, required for calculating a pulse rate value having the desired accuracy.

Then, the rate of change of pulse rate can be calculated by determining the difference between the logarithms of the pulse rates calculated for the values in the memories of groups 40 and 42, and dividing the difference value by a value equal to:

$$(I_1 + I_2)/2$$

where
$I_1$ = the interval count sum associated with group 42;
$I_2$ = the interval count sum associated with group 40;
The value of $(I_1 + I_2)/2$ corresponds to the time between the centers of the total measuring periods associated with groups 42 and 40.

The occurrence of each write-in to the uppermost memory locations is signalled to registers 30 and 32 by the delivery of each write-in pulse thereto from the output of OR gate 17.

To enable the above-described rate of change calculation to be performed, memory 22 must contain more than 150 memory locations. However, the total number of memory locations required will still be far smaller than would be required if each location stored the data associated with a single measuring interval.

In the implementation of the invention, each new input to the uppermost memory locations 24, 26 can trigger a new pulse rate calculation and an associated rate of change calculation.

It may occur that the data pulse rate is so low that an unacceptably long time period elapses between pulses. This situation is avoided by the action of components 17, 19 and 20. If counter 8 should reach a predetermined count, for example a count of 256 intervals, without a data pulse having been received, logic 19 senses the predetermined count and produces a pulse which places a representation of a single data pulse into buffer memory 10, via OR gate 20, and triggers, via OR gate 17, write-ins from buffer memories 10 and 12 to the uppermost memory locations 24 and 26, followed by resetting of counter 8. Inputting of a count of one data pulse to location 24 is selected arbitrarily to represent the lowest count indicated by the system.

It will be appreciated that the present invention can be easily implemented by suitably programming a general purpose data processing system.

It will be understood that the above description of the present invention is susceptible to various modifications, changes and adaptations, and the same are intended to be comprehended within the meaning and range of equivalents of the appended claims.

We claim:

1. Apparatus for monitoring the time rate of successive events the rate of occurrence of which can vary over a wide range, comprising;

clock signal generating means producing a succession of clock pulses at a rate between the minimum and maximum values of the range over which the rate of occurrence of the successive events can occur, with the periods between successive clock pulses constituting consecutive time intervals of equal duration;

input means connected receiving representations of successive events during a succession of consecutive time intervals;

event counting means connected to said input means for producing a plurality of successive counts each representing the number of events occurring during each interval in which at least one event occurs;

interval counting means operatively associated with said event counting means and connected to said clock signal generating means for producing a plurality of successive counts each representing the number of intervals between the end of a respective interval in which at least one event occurred and the end of the immediately preceding interval in which at least one event occurred; and first memory means connected to said event counting means for storing representations of the plurality of successive counts produced by said event counting means, and second memory means connected to said interval counting means for storing representations of successive counts produced by said interval counting means.

2. Apparatus as defined in claim 1 wherein said memory means comprise first and second groups of memory locations, said first group being arranged to store the representations of the successive counts produced by said event counting means, and said second group being arranged to store the representations of the successive counts produced by said interval counting means.

3. Apparatus as defined in claim 2 wherein said first group of memory locations comprises a plurality of successive memory locations each connected to store the representation of a respective count produced by said event counting means, and said second group of memory locations comprises a plurality of successive memory locations each associated with a respective memory location of said first group and each connected to store the representation of the respective count produced by said interval counting means in time coincidence with the production of the count for which a representation is stored in the associated memory location of said first group.

4. Apparatus as defined in claim 3 wherein each said plurality of successive memory locations includes a first memory location connected to store the count representations associated with the most recent interval in which at least one event occurs, and count representations associated with intervals preceding the most recent interval are stored in respective ones of said memory locations of each said group following said first memory location in sequence.

5. Apparatus as defined in claim 4 further comprising: first summing means connected to said memory locations of said first group for determining the number of successive memory locations of said first group, starting from said first memory location, whose stored representations represent, in total, at least a selected number of events; and second summing means connected to said memory locations of said second group for providing a representation of the sum of the counts for which representations are stored in those memory locations of said second group which are associated with said number of successive memory locations of said first group.

6. Apparatus as defined in claim 5 wherein said first summing means provides a representation of the total number of events for which count representations are stored in said number of successive memory locations of said first group.

7. Apparatus as defined in claim 6 further comprising calculating and display means connected to said first and second summing means for calculating and displaying an event rate indication proportional to the quotient of the representation provided by said first summing means divided by the representation concurrently provided by said second summing means.

8. Apparatus as defined in claim 7 wherein said calculating and display means further operate to produce a rate change indication based on the relation between successively calculated event rate indications.

9. A method for monitoring the time rate of successive events the rate of occurrence of which can vary over a wide range, comprising:

detecting the successive events during a succession of consecutive time intervals of equal duration, with the duration of each interval being shorter than the average time between successive events occurring at a rate at the lower extremity of the range;

producing a plurality of successive counts each representing the number of events occurring during each interval in which at least one event occurs;

producing a plurality of successive counts each representing the number of intervals between the end of a respective interval in which at least one event occurred and the end of the immediately preceding interval in which at least one event occurred; and separately storing representations of each of said pluralities of successive counts.

10. A method as defined in claim 9 further comprising electronically determining the rate of occurrence of events by dividing the sum of a plurality of successive counts of the numbers of events occurring during successive intervals in which at least one event occurs by the sum of the time coincident plurality of successive counts of the number of intervals.

* * * * *